United States Patent
Yamamoto et al.

(10) Patent No.: US 11,376,747 B2
(45) Date of Patent: Jul. 5, 2022

(54) ROBOT CONTROLLER AND ROBOTIC SYSTEM

(71) Applicant: FANUC CORPORATION, Yamanashi (JP)

(72) Inventors: Tomoyuki Yamamoto, Yamanashi (JP); Nobuhiro Yoshida, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 308 days.

(21) Appl. No.: 16/683,675

(22) Filed: Nov. 14, 2019

(65) Prior Publication Data

US 2020/0156262 A1    May 21, 2020

(30) Foreign Application Priority Data

Nov. 15, 2018   (JP) .............................. JP2018-214844

(51) Int. Cl.
*B25J 9/16* (2006.01)
*B25J 15/04* (2006.01)

(52) U.S. Cl.
CPC ............... *B25J 15/04* (2013.01); *B25J 9/163* (2013.01)

(58) Field of Classification Search
CPC .... B25J 15/04; B25J 15/0483; B25J 15/0466; A61B 2017/00477; Y10S 901/41
See application file for complete search history.

(56) References Cited

U.S. PATENT DOCUMENTS

| | | | | |
|---|---|---|---|---|
| 2008/0249551 | A1* | 10/2008 | Sunaoshi | A61B 34/70 606/170 |
| 2009/0198379 | A1* | 8/2009 | Komuro | B25J 9/1674 700/250 |
| 2018/0168762 | A1* | 6/2018 | Scheib | B25J 15/0466 |
| 2019/0022859 | A1* | 1/2019 | Ogawara | B25J 9/1635 |
| 2019/0111575 | A1* | 4/2019 | Asano | B25J 15/0066 |
| 2021/0197401 | A1* | 7/2021 | Weintraub | A61B 34/30 |

FOREIGN PATENT DOCUMENTS

| | | |
|---|---|---|
| CN | 207448495 U | 6/2018 |
| JP | S5993286 A | 5/1984 |
| JP | S6440288 A | 2/1989 |
| JP | H7237165 A | 9/1995 |
| JP | 200236155 A | 2/2002 |
| JP | 2009-184048 A | 8/2009 |
| JP | 2011156649 A | 8/2011 |

* cited by examiner

*Primary Examiner* — Ryan Rink
(74) *Attorney, Agent, or Firm* — Hauptman Ham, LLP

(57) ABSTRACT

The robot controller includes: a memory configured to store a first value representing a position of a first movable member detected by a first position detector when a first tool including the first movable member and the first position detector is detached from a robot or when the first movable member moves to a predetermined position; and a processor configured to execute a predetermined process in accordance with a difference between the first value stored in the memory and a second value representing a position of a second movable member detected by a second position detector when a second tool including the second movable member and the second position detector is attached to the robot or when the second movable member moves to the predetermined position after the second tool is attached to the robot.

4 Claims, 7 Drawing Sheets

FIG. 5

| | TOOL 1 | TOOL 2 | TOOL 3 | ... |
|---|---|---|---|---|
| DETACHING COUNT VALUE | 1234567 | 2345678 | 3456789 | ... |

|  | TOOL 1 | TOOL 2 | ... |
|---|---|---|---|
| DETACHING COUNT VALUE | 1234567 | 3456789 | ... |
|  | 2345678 | 4567890 | ... |

700

ROBOT CONTROLLER AND ROBOTIC SYSTEM

RELATED APPLICATIONS

The present application claims priority of Japanese Application Number 2018-214844, filed Nov. 15, 2018, the disclosure of which is hereby incorporated by reference herein in its entirety.

FIELD

The present invention relates to, for example, a controller of a robot that enables a tool to be attached thereto and detached therefrom and a robotic system including such a controller.

BACKGROUND

For a robot on which any one of various types of tools can be attached, a technique for improving safety in changing the tool has been proposed (see, for example, Japanese Unexamined Patent Publication (Kokai) No. 2009-184048). For example, in the technique, first tool identification information indicating a current tool, which is output from a robot controller and used by the robot controller for an administrative purpose, is compared with second tool identification information for detecting the tool attached to the robot and identifying the tool. In a period in which it is determined that the first tool identification information does not match the second tool identification information, when positional coordinates of a teaching reference point for the robot is outside a predetermined region, an emergency stop signal for putting the robot in a safe condition is output.

SUMMARY

However, in the above-mentioned technique, when the first tool identification information is incorrectly input, or when the second tool identification information is incorrectly detected due to a failure of a device for detecting the second tool identification information, although a tool identified by the first tool identification information and a tool actually attached to the robot are different, it may be mistakenly determined that these tools are identical.

In one aspect, an object of the present invention is to provide a robot controller that can correctly identify a tool attached to a robot.

According to one embodiment, a robot controller is provided. The robot controller includes: a memory configured to store a first value representing a position of a first movable member detected by a first position detector when a first tool including the first movable member and the first position detector that detects the position of the first movable member is detached from a robot or when the first movable member moves to a predetermined position; and a processor configured to execute a predetermined process in accordance with a difference between the first value stored in the memory and a second value representing a position of a second movable member detected by a second position detector when a second tool including the second movable member and the second position detector that detects the position of the second movable member is attached to the robot or when the second movable member moves to the predetermined position after the second tool is attached to the robot.

According to another embodiment, a robot controller is provided. The robot controller includes: a memory configured to store a first value representing a position of a movable member detected by a position detector when a tool including the movable member and the position detector that detects the position of the movable member is detached from a robot or when the movable member moves to a predetermined position; and a processor configured to determine whether or not to allow the tool to be detached in accordance with a difference between the first value stored in the memory and a second value representing a current position of the movable member detected by the position detector, or determine whether or not to allow the tool to be detached in accordance with a difference between the first value stored in the memory and a second value which represents a position of the movable member and is obtained when the movable member is at the predetermined position.

According to still another embodiment, a robotic system including at least one tool, a robot including an attaching/detaching device that enables the at least one tool to be attached thereto/detached therefrom, and a controller that controls the robot is provided. In the robotic system, the at least one tool includes: a movable member; and a position detector that detects a position of the movable member. The controller includes: a memory configured to store a first value representing the position of the movable member of any one of the at least one tool detected by the position detector of the tool when the tool is detached from the robot or when the movable member of the tool moves to a predetermined position; and a processor configured to execute a predetermined process in accordance with a difference between the first value stored in the memory and a second value representing the position of the movable member of any one of the at least one tool detected by the position detector of the tool when the tool is attached to the robot or when the movable member of the tool moves to the predetermined position after the tool is attached to the robot.

According to one aspect, a tool attached to a robot can be correctly identified.

BRIEF DESCRIPTION OF DRAWINGS

FIG. 5 is a diagram illustrating an example of a detaching count value stored in a memory.

FIG. 7 is a diagram illustrating an another example of the detaching count values stored in the memory according to a variation.

DESCRIPTION OF EMBODIMENTS

With reference to the drawings, a controller of a robot and a robotic system including such a controller will be described. In the robot controlled by the controller, a plurality of tools can be alternately attached and detached. Each of the tools is what is called a servo tool, which is a tool including a power unit, such as a motor, that generates power and a movable member driven by the power unit. The tools further include a position detection unit, such as an encoder, that detects a position of the movable member, and can hold the movable member at a position where the tool is detached from the robot. In detaching a tool already attached to the robot from the robot, only when a difference between a position of a movable member of the tool and a position of a movable member of another tool for which the position of the movable member is already stored (hereinafter, such a tool may be referred to as a registered tool for the purpose of description) is equal to or greater than a predetermined threshold value, the controller allows the tool to be detached and stores the position of the movable member where the tool is detached. The tool also holds the movable member at the position where the tool is detached. When any one of the tools is next attached to the robot and a difference between a position of a movable member of a tool to be attached and the stored position of the movable member of any one of the registered tools is less than the predetermined threshold value, the controller executes a process such as a process of identifying that the tool to be attached is identical with the registered tool; on the other hand, when the difference is equal to or greater than the predetermined threshold value for each registered tool, the controller determines that the tool to be attached differs from each registered tool and executes processing in accordance with the determination result. In this manner, even if identification information of the tool to be attached to the robot is not input to the controller, the controller can identify the tool on the basis of the position of the movable member where the tool was detached. Therefore, the controller can correctly identify the tool attached to the robot.

Figure 1:
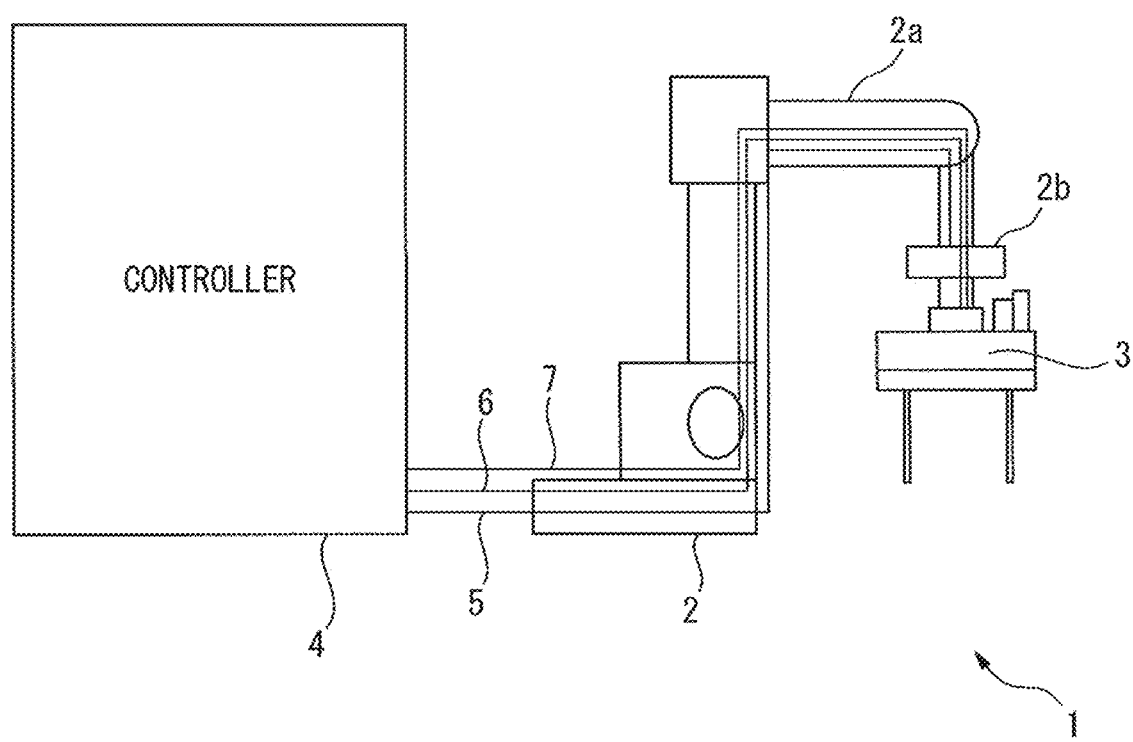
FIG. 1 is a schematic configuration diagram of a robotic system according to one embodiment.

FIG. 1 is a schematic configuration diagram of a robotic system 1 according to one embodiment. The robotic system 1 includes a robot 2, a plurality of tools 3 that can be attached to the robot 2, and a controller 4 that controls the robot 2. Note that, in FIG. 1, only one tool attached to the robot 2 among the plurality of tools 3 is illustrated as a representative.

The robot 2 includes a mechanical unit 2a that includes at least one shaft, and each of the at least one shaft is driven by a servomotor (not illustrated) to change a position and a posture of the mechanical unit 2a. At a distal end of the mechanical unit 2a, there is provided a tool attaching/detaching device 2b that enables one of the tools 3 to be attached thereto/detached therefrom. One of the tools 3 is attached to the robot 2 by means of the tool attaching/detaching device 2b. Note that a position where the tool attaching/detaching device 2b is provided need not be the distal end of the mechanical unit 2a and may be provided at any position of the mechanical unit 2a in accordance with the specification of the robot 2.

The tool attaching/detaching device 2b includes an attaching mechanism (not illustrated) for attaching one of the tools 3 thereon. When an operator performs an operation of attaching one of the tools 3 (hereinafter, referred to as an operation target tool) on the tool attaching/detaching device 2b, the attaching mechanism clamps the operation target tool and the operation target tool is locked so as not to come off from the tool attaching/detaching device 2b. The tool attaching/detaching device 2b connects a power line 6 and a signal line 7, which are connected to the controller 4, to the operation target tool. Therefore, the operation target tool attached to the robot 2 by means of the tool attaching/detaching device 2b and the controller 4 are connected to each other through the power line 6 and the signal line 7. A signal indicating an operational status of the operation target tool such as information indicating a position of a movable member included in the operation target tool is transmitted to the controller 4 through the signal line 7. In addition, electric power for driving the operation target tool is supplied from the controller 4 to the operation target tool through the power line 6.

When the tool attaching/detaching device 2b receives a control signal for detaching the operation target tool from the controller 4 through the signal line 5, the tool attaching/detaching device 2b disconnects the operation target tool from the power line 6 and the signal line 7 and releases the lock provided by the attaching mechanism on the operation target tool to enable the operation target tool to be detached.

The tool attaching/detaching device 2b may further include an ammeter (not illustrated) for measuring a current passing through the power line 6 or a voltmeter (not illustrated) for measuring a voltage across the power line 6. The tool attaching/detaching device 2b may output, at a constant frequency or in response to an inquiry from the controller 4, a signal indicating a measured current value or a measured voltage value to the controller 4 through the signal line 5.

Furthermore, the tool attaching/detaching device 2b may further include a device for identifying the attached operation target tool. For example, the tool attaching/detaching device 2b may include a tool identification device that sets a tool number and outputs the tool number on a side of the tool attaching/detaching device 2b, the side to which the tool is attached. The tool attaching/detaching device 2b outputs the tool number provided by the tool identification device to the controller 4 through the signal line 5.

Figure 2:
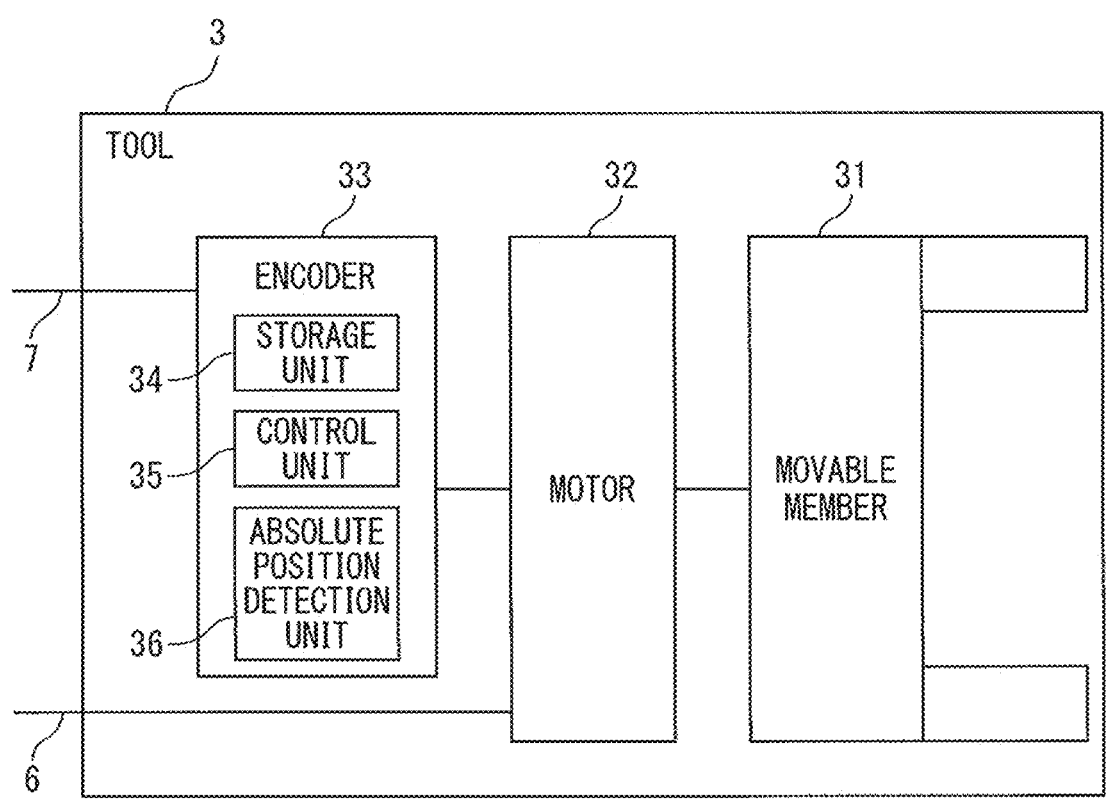
FIG. 2 is a schematic configuration diagram of a tool.

FIG. 2 is a schematic configuration diagram of one of the plurality of tools 3. Since each of the tools 3 has the configuration illustrated in FIG. 2, only one of the tools will be described below. The tool 3 includes a movable member 31, a motor 32, and an encoder 33. The encoder 33 includes a storage unit 34, a control unit 35, and an absolute position detection unit 36. The tool 3 may further include a battery (not illustrated) and a braking mechanism (not illustrated).

The movable member 31 is a member with which the robot 2 performs some operation on a work object, for example, a hand that grips the work object or a welding gun for processing the work object. The movable member 31 is, for example, directly fixed to a rotation shaft of the motor 32 or indirectly attached to the rotation shaft via a gear or the like, and changes the position by being driven by the motor 32. When the tool 3 is detached from the tool attaching/detaching device 2b, the movable member 31 is locked by the braking mechanism so as not to move. The lock provided by the braking mechanism is released when the tool 3 is attached to the tool attaching/detaching device 2b again and electric power is supplied to the tool 3.

The motor 32 is an example of the power unit and rotates in accordance with electric power supplied through the power line 6 to drive the movable member 31.

The encoder 33 is an example of a position detector. The encoder 33 is, for example, fixed to the rotation shaft of the motor 32 or a rotation shaft connected to the rotation shaft of the motor 32 via the gear and detects a rotation amount of the motor 32 to detect the position of the movable member 31. In the present embodiment, the encoder 33 may be an absolute rotary encoder that outputs a pulse count value corresponding to a rotation angle from an origin. The encoder 33 outputs a pulse count value indicating the rotation angle from the origin of the rotation shaft to which the encoder 33 is fixed to the controller 4.

The storage unit 34 includes, for example, a volatile readable/writable semiconductor memory. The storage unit 34 stores a value representing a position of the movable member. As described above, in the present embodiment, since the encoder 33 is an absolute rotary encoder, the storage unit 34 stores a number of rotations from the origin of the rotation shaft to which the encoder 33 is fixed (hereinafter, which may be referred to simply as the number of rotations of the encoder 33), and the storage unit 34 need not store information on an absolute position within one revolution (i.e., the rotation angle from the origin within one revolution).

The storage unit 34 retains information written into the storage unit 34, for example, with electric power supplied by the battery (not illustrated). Therefore, even when the tool 3 is detached from the robot 2, the storage unit 34 can retain the number of rotations of the encoder 33.

Note that the storage unit 34 may include a non-volatile readable/writable semiconductor memory. In this case, even when the tool 3 is detached from the robot 2 and electric power is not supplied from the controller 4, the information written into the storage unit 34 is still retained, and the tool 3 therefore need not include the battery.

In a state in which the tool 3 is attached to the robot 2, the controller 4 supplies electric power through the power line 6 to drive the motor 32. The control unit 35 counts the number of rotations of the encoder 33 from the origin in accordance with a signal received from the absolute position detection unit 36, and writes the result of counting into the storage unit 34. For example, when the motor 32 rotates in a predetermined direction (e.g., a clockwise direction), every time the control unit 35 receives an absolute position (e.g., the zero position) used as a reference for one revolution or less, the control unit 35 increments the number of rotations of the encoder 33 by one. On the other hand, when the motor 32 rotates in a direction opposite to the predetermined direction (e.g., a counterclockwise direction), every time the control unit 35 receives the absolute position used as the reference for one revolution or less from the absolute position detection unit 36, the control unit 35 decrements the number of rotations of the encoder 33 by one.

Furthermore, when the control unit 35 receives, from the controller 4, a signal for inquiring about the position of the movable member 31, the control unit 35 reads the number of rotations of the encoder 33 from the storage unit 34, and calculates a pulse count value, which is obtained by multiplying the number of rotations by the pulse number corresponding to one revolution of the encoder 33 and adding, to the resultant value, a pulse number representing the absolute position within one revolution received from the absolute position detection unit 36, as information indicating the position of the movable member 31. The control unit 35 then outputs the pulse count value to the controller 4 through the signal line 7. Note that, when the encoder 33 is fixed to the rotation shaft connected to the rotation shaft of the motor 32 by means of the gear, the pulse count value may be calculated using a value obtained by multiplying the number of rotations that has been read by a gear ratio.

When the pulse number corresponding to one revolution of the encoder 33 is several hundreds to several thousands or greater, in detaching the tool from the tool attaching/detaching device 2b, the position of the movable member 31 may be easily set to a position corresponding to a different rotation angle for each tool. Accordingly, the control unit 35 may output the pulse number itself that has been received from the absolute position detection unit 36 and represents the absolute position within one revolution as the pulse count value representing the position of the movable member 31 to the controller 4 through the signal line 7.

The absolute position detection unit 36 includes, for example, a disk-shaped member fixed to the rotation shaft of the motor 32, and a plurality of light sources such as an LED and a plurality of light-receiving devices such as a photodiode, which are installed across the disk-shaped member in such a way as to face against each other. In the disk-shaped member, at every predetermined rotation angles from the origin, a plurality of slits indicating the rotation angle are formed between the light sources and the light-receiving devices. Therefore, the absolute position detection unit 36 can detect, on the basis of a combination of the light-receiving devices that can receive light from corresponding light sources, the rotation angle from the origin, i.e., the absolute position within one revolution.

The encoder 33 may be an incremental rotary encoder that outputs a pulse every time the encoder rotates by a predetermined angle. In this case, the encoder 33 includes, instead of the absolute position detection unit 36, a pulse detection unit, and the control unit 35 may store a total number of pulses received from the pulse detection unit from when the movable member 31 is positioned at the origin until when the movable member 31 moves to the current position of the movable member 31 as the pulse count value in the storage unit 34. When the control unit 35 receives an inquiry from the controller 4 about the position of the movable member 31, the control unit 35 may output the pulse count value stored in the storage unit 34 to the controller 4 through the signal line 7. The pulse detection unit includes, for example, a disk-shaped member fixed to the rotation shaft of the motor 32, and a light source such as an LED and a light-receiving device such as a photodiode, which are installed across the disk-shaped member in such a way as to face against each other. In the disk-shaped member, at every predetermined rotation angles from the origin, slits are formed between the light source and the light-receiving device. Therefore, every time the rotation shaft of the motor 32 rotates by the predetermined rotation angle, by receiving light from the light source through the slit with the light-receiving device, the pulse detection unit outputs a pulse.

The controller 4 controls, for example, in accordance with a program that specifies a motion of the robot 2 or an instruction of the operator, the servomotor that drives each shaft of the robot 2, to control the position and the posture of the robot 2. In addition, the controller 4 is connected to the operation target tool attached to the tool attaching/detaching device 2b, among the plurality of tools 3, through the power line 6 and the signal line 7. The controller 4 controls the operation target tool through the power line 6 and the signal line 7.

Figure 3A:
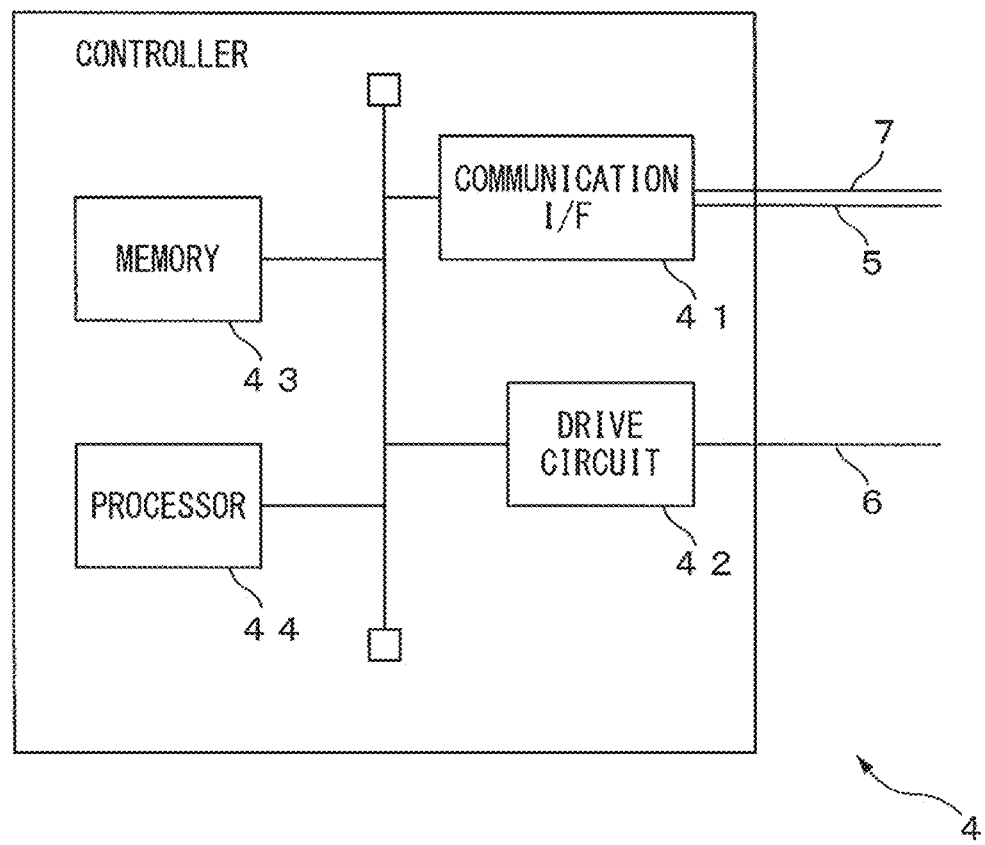
FIG. 3A is a schematic configuration diagram of a controller.

FIG. 3A is a diagram illustrating a schematic configuration of the controller 4 and functional blocks of a processor included in the controller. The controller 4 includes a communication interface 41, a drive circuit 42, a memory 43, and a processor 44. The controller 4 may further include a user interface (not illustrated) such as a touch screen.

The communication interface 41 is an example of a communication unit and includes, for example, a communication interface for connecting the controller 4 to the signal line 5 and the signal line 7, a circuit for executing a process of transmitting/receiving a signal through the signal line 5 and the signal line 7, and the like. The communication interface 41 receives, for example, the pulse count value representing the position of the movable member 31 from the tool 3 through the tool attaching/detaching device 2b and the signal line 7. In addition, the communication interface 41 outputs a control signal for detaching the tool 3 that has been received from the processor 44 to the tool attaching/detaching device 2*b* through the signal line 5.

The drive circuit 42 is connected to the tool 3 through the power line 6, and supplies, in accordance with the control by the processor 44, electric power in accordance with a torque, a direction of rotation, or a rotational speed to be generated by the motor 32 included in the tool 3 to the tool 3 through the power line 6.

The memory 43 is an example of the storage unit and includes, for example, a readable/writable semiconductor memory and a read-only semiconductor memory. The memory 43 may further include a storage medium such as a semiconductor memory card, a hard disk, or an optical storage medium and a device for accessing the storage medium.

The memory 43 stores various types of computer programs for controlling the robot 2 and the like, which are executed by the processor 44 of the controller 4. The memory 43 also stores a computer program for processes of determining whether or not to allow the tool 3 to be detached and identifying the tool 3, which is executed by the processor 44. In addition, the memory 43 stores various types of information for use in the processes of determining whether or not to allow the tool 3 to be detached and identifying the tool 3 (the detaching determination process and the identification process), for example, the pulse count value representing the position of the movable member 31 where the registered tool is detached, a threshold value for the detaching determination process, the identification process, or the like.

The processor 44 is an example of a control unit and includes a Central Processing Unit (CPU) and a peripheral circuit thereof. The processor 44 may further include a processor for numeric operations. The processor 44 controls the entire robotic system 1. The processor 44 also executes the processes of determining whether or not to allow the tool 3 to be detached and identifying the tool 3.

Figure 3B:
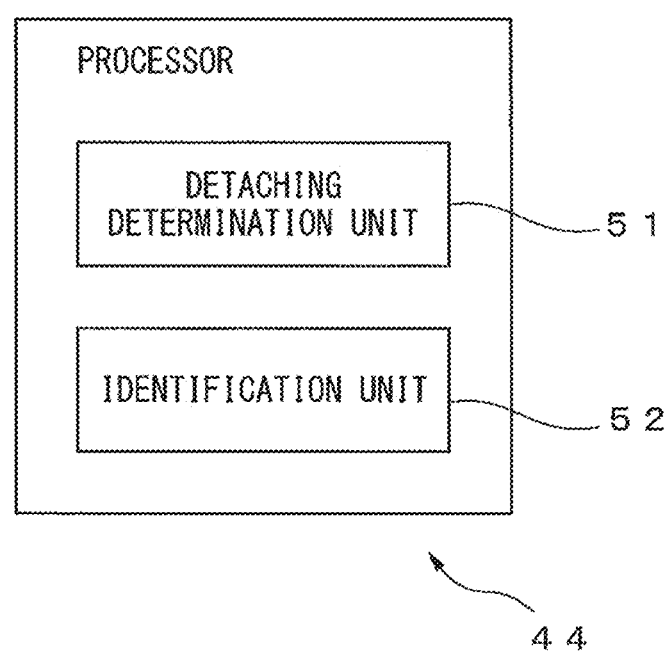
FIG. 3B is a functional block diagram of a processor of the controller.

FIG. 3B is a functional block diagram of the processor 44. As illustrated in FIG. 3B, the processor 44 includes a detaching determination unit 51 and an identification unit 52.

Each of the units included in the processor 44 is, for example, a functional module achieved by a computer program executed by the processor 44. Alternatively, each of the units may be achieved as a dedicated arithmetic circuit implemented as part of the processor 44.

When the detaching determination unit 51 is instructed by the computer program executed by the processor 44 to detach the operation target tool attached to the tool attaching/detaching device 2*b*, or when the detaching determination unit 51 is instructed by the operator through the user interface to detach the operation target tool attached to the tool attaching/detaching device 2*b*, the detaching determination unit 51 determines whether or not the operation target tool may be detached.

Figure 4:
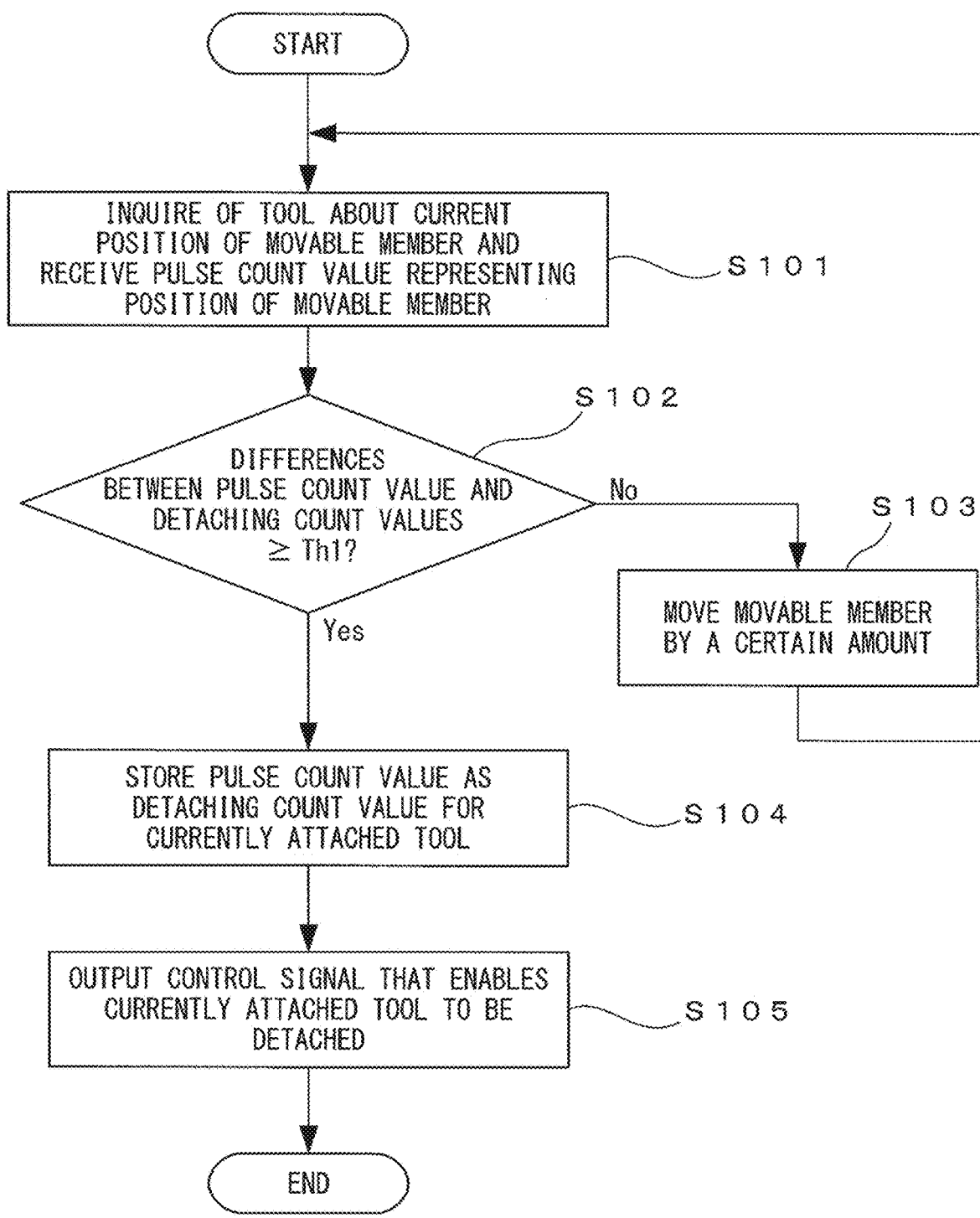
FIG. 4 is an operational flowchart of a detaching determination process.

FIG. 4 is an operational flowchart of the detaching determination process. Every time the detaching determination unit 51 is instructed to detach the operation target tool, the detaching determination unit 51 executes, in accordance with the operational flowchart described below, the detaching determination process.

The detaching determination unit 51 inquires, through the communication interface 41 and the signal line 7, of the operation target tool about the current position of the movable member 31 (step S101). The detaching determination unit 51 then receives from the operation target tool, through the signal line 7 and the communication interface 41, the pulse count value representing the position of the movable member 31.

When the detaching determination unit 51 receives the pulse count value, the detaching determination unit 51 determines, for each of the registered tools, whether or not a difference between the pulse count value obtained when the registered tool was detached from the tool attaching/detaching device 2*b* (hereinafter, referred to as the detaching count value for the purpose of description), which is stored in the memory 43, and the received pulse count value is equal to or greater than a first threshold value Th1 (step S102).

When the difference between the detaching count value and the received pulse count value is less than the first threshold value Th1 for any one of the registered tools (step S102—No), the detaching determination unit 51 informs the operator that the operation target tool may not be detached at the position through the user interface. In this case, the operator may issue, through the user interface, an instruction to detach the operation target tool after moving the position of the movable member. Alternatively, the detaching determination unit 51 may add any number of rotations to or subtract any number of rotations from the number of rotations of the encoder 33 from the origin stored in the storage unit 34 of the operation target tool in such a way that a difference between the pulse count value and each pulse count value stored in the memory 43 is equal to or greater than the threshold value Th1. Then, the detaching determination unit 51 may set a value obtained by adding a pulse number corresponding to the any number of rotations to or subtracting the pulse number corresponding to any number of rotations from a pulse count value corresponding to a reference position of the movable member (e.g., the zero-degree position serving as the origin) as a new pulse count value corresponding to the reference position of the movable member in such a way that a difference between the pulse count value corresponding to the current detaching position and the pulse count value stored in the memory 43 is not less than the threshold value Th1. Alternatively, the detaching determination unit 51 may supply, through the drive circuit 42 and the power line 6, electric power to the operation target tool to move the movable member 31 by a certain amount (step S103). In this manner, the movable member automatically moves to a position where the operation target tool may be detached, and the operator can know the position where the operation target tool may be detached, and consequently, the operator can detach the operation target tool by issuing a detaching instruction at the position again. Note that the certain amount may be set to a preset value or a value that causes differences between all the detaching count values stored in the memory 43 and the received pulse count value to be the first threshold value Th1 or greater.

After a certain period of time from supplying electric power that causes the movable member 31 to move by the certain amount to the operation target tool, the detaching determination unit 51 executes the process from step S101 again. Note that the certain period of time may be set, for example, to an amount of time sufficient for the movable member 31 to move by the certain amount.

On the other hand, when the difference between the detaching count value and the received pulse count value is equal to or greater than the first threshold value Th1 for each of the registered tools (step S102—Yes), the detaching determination unit 51 determines that the operation target tool may be detached. The detaching determination unit 51 then stores the received pulse count value as the detaching count value for the operation target tool currently attached to the tool attaching/detaching device 2b in the memory 43 to newly register the operation target tool (step S104). Subsequently, the detaching determination unit 51 outputs a control signal that enables the operation target tool to be detached, through the communication interface 41 and the signal line 5, to the tool attaching/detaching device 2b (step S105). Note that, when the detaching determination unit 51 is put into a state in which reception of the signal from the operation target tool is not possible through the signal line 7 and the value of the current passing through the power line 6 measured by the ammeter or the value of the voltage across the power line 6 measured by the voltmeter is less than a predetermined threshold value, the detaching determination unit 51 may determine that the operation target tool has been detached. Then, the detaching determination unit 51 ends the detaching determination process.

In this manner, for each of the registered tools, a different detaching count value is stored in the memory 43. Therefore, even if the controller 4 does not receive, from the tool attaching/detaching device 2b, identification information for the currently attached tool 3, the controller 4 can identify the tool 3 on the basis of the detaching count value.

FIG. 5 is a diagram illustrating an example of the detaching count value stored in the memory 43. As illustrated in Table 500, a different detaching count value is recorded for each tool. Note that, although tool numbers are described in Table 500, the tool numbers are shown for the purpose of description and need not be stored in the memory 43. Alternatively, when the detaching determination unit 51 writes the detaching count value into the memory 43, the detaching determination unit 51 may write a unique number for each detaching count value along with the detaching count value into the memory 43. In this case, when the tool attaching/detaching device 2b outputs an identification signal for the attached operation target tool, the detaching determination unit 51 may write an identification number indicated by the identification signal for the operation target tool into the memory 43 along with the detaching count value.

When any one of the plurality of tools 3 is to be attached to the tool attaching/detaching device 2b, the identification unit 52 identifies the operation target tool to be attached.

Figure 6:
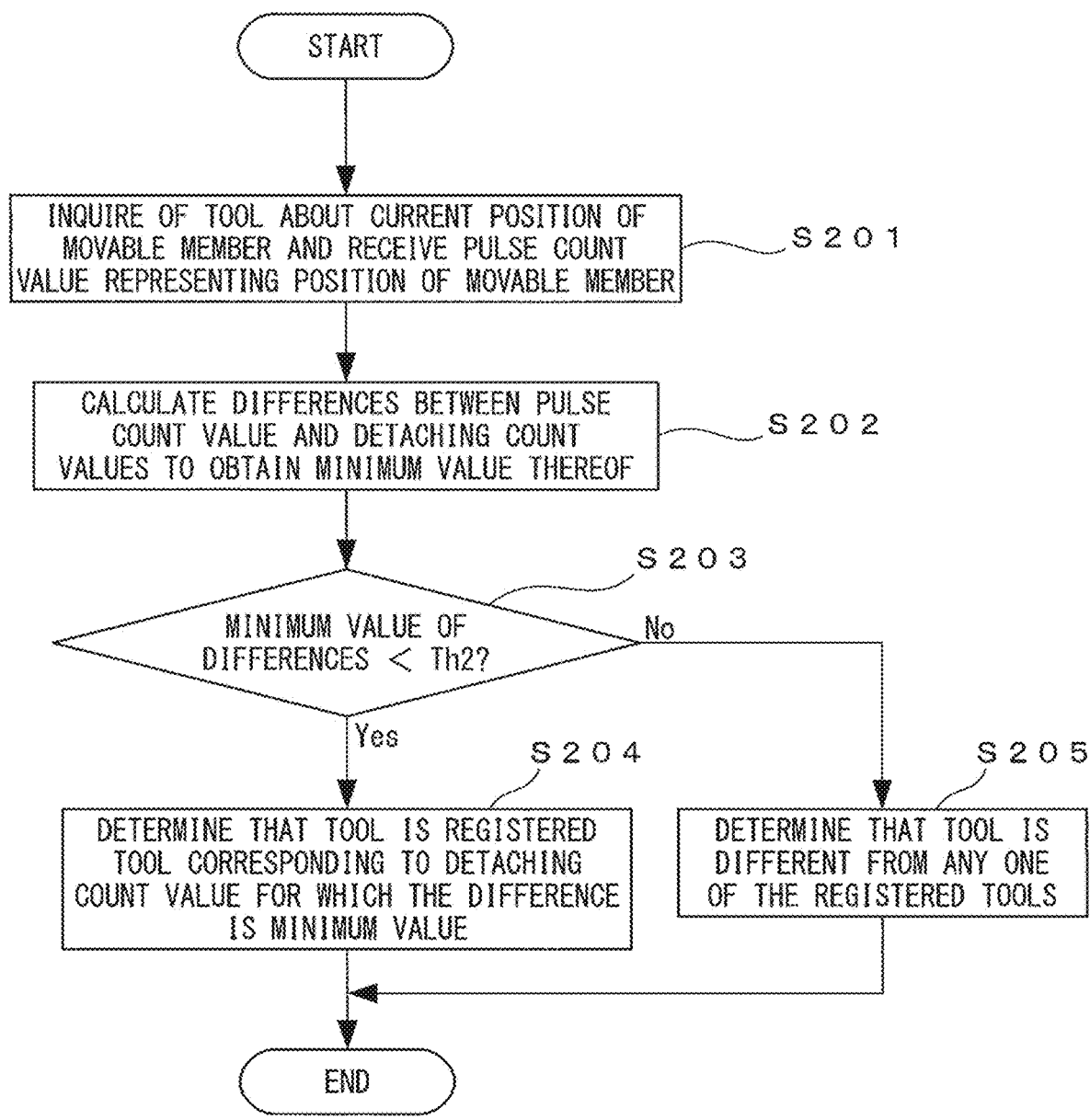
FIG. 6 is an operational flowchart of an identification process.

FIG. 6 is an operational flowchart of the identification process. Every time attaching of the tool 3 is instructed, the identification unit 52 performs, in accordance with the operational flowchart described below, the identification process.

The identification unit 52 inquires, through the communication interface 41 and the signal line 7, of the operation target tool attached to the tool attaching/detaching device 2b about the current position of the movable member 31 (step S201). The identification unit 52 then receives from the operation target tool, through the signal line 7 and the communication interface 41, the pulse count value representing the position of the movable member 31.

When the identification unit 52 receives the pulse count value, the identification unit 52 reads, for each of the registered tools, the detaching count value from the memory 43, calculates a difference between the detaching count value that has been read for each of the registered tools and the received pulse count value to obtain a minimum value of the differences (step S202).

The identification unit 52 determines whether or not the minimum value of the differences is less than a second threshold value Th2 (step S203). When the minimum value of the differences is less than the second threshold value Th2 (step S203—Yes), the identification unit 52 determines that the operation target tool is the registered tool corresponding to the detaching count value for which the difference is the minimum value (step S204). In this case, the identification unit 52 may inform the operator that the operation target tool is identical with the registered tool through the user interface. In addition, the identification unit 52 may make the robot 2 or the operation target tool operable.

On the other hand, when the minimum value of the differences is equal to or greater than the second threshold value Th2 (step S203—No), the identification unit 52 determines that the operation target tool is different from any one of the registered tools (step S205). In this case, the identification unit 52 may inform the operator that the operation target tool is different from any one of the registered tools through the user interface. In addition, the identification unit 52 may make the robot 2 or the operation target tool inoperable. In this case, when the operator registers, through the user interface, the pulse count value corresponding to the reference position of the movable member 31, the identification unit 52 may make the robot 2 or the operation target tool operable.

After step S204 or S205, the identification unit 52 ends the identification process.

Note that, for example, the second threshold value Th2 may be set to a value equivalent to a maximum amount of movement of the movable member 31 before the movable member 31 is locked by the braking mechanism when the tool 3 is detached from the tool attaching/detaching device 2b. The first threshold value Th1 may be set, for example, to a value obtained by adding a predetermined margin to the second threshold value Th2.

When the identification unit 52 determines that the operation target tool attached to the tool attaching/detaching device 2b is identical with one of the registered tools, the detaching determination unit 51 may delete the detaching count value for the operation target tool, which is stored in the memory 43, or exclude the detaching count value for the registered tool that has been determined to be identical with the operation target tool from the processing in step S102 when the operation target tool is detached again. Furthermore, when the identification unit 52 determines that the operation target tool attached to the tool attaching/detaching device 2b is identical with one of the registered tools, the detaching determination unit 51 may supply, while the operation target tool is detached, electric power for moving the movable member 31 to a position designated by the detaching count value for the registered tool that has been determined to be identical with the operation target tool, through the drive circuit 42 and the power line 6, to the operation target tool attached to the tool attaching/detaching device 2b. In this manner, the controller 4 can move, with respect to a tool that is repeatedly attached to and detached from the tool attaching/detaching device 2b a plurality of times, the movable member 31 to the same position every time the tool is detached from the tool attaching/detaching device 2b.

Note that, when the control unit 35 of the operation target tool attached to the tool attaching/detaching device 2b outputs a pulse count value at every predetermined period, or when the control unit 35 outputs a pulse count value every time the movable member 31 is moved to a target position in accordance with a control by the controller 4, in step S101 of FIG. 4 and step S201 of FIG. 6, the processor 44 need not inquire the position of the movable member.

As described above, when the tool attached to the tool attaching/detaching device of the robot is detached, the controller controls the movable member of the tool in such a way that the position of the movable member is different for each tool. In addition, when the tool is attached to the tool attaching/detaching device, the controller can also identify the tool to be attached by comparing the position of the movable member of the tool with positions of movable members of other tools that have been attached to the tool attaching/detaching device in the past. Therefore, even if the controller does not receive, from the tool attaching/detaching device, identification information for the tool to be attached, the controller can identify the tool. Consequently, the controller can correctly identify the tool attached to the robot. Accordingly, a possibility that the tool identified by the controller is different from the tool actually attached to the tool attaching/detaching device is avoided, and a risk caused by an unexpected motion of the tool is prevented.

According to a variation, the tool 3 may include a plurality of motors that drive a movable member and a plurality of encoders provided for each motor. The motors may drive different portions of a single movable member or the motors may each drive a different one of a plurality of movable members. In this case, when the operation target tool attached to the tool attaching/detaching device 2b receives an inquiry from the controller 4 about the position of the movable member/members, the operation target tool may transmit pulse count values for the respective encoders as a signal indicating the position of the movable member/members to the controller 4 through the signal line 7. The detaching determination unit 51 of the processor 44 of the controller 4 may then compare the received pulse count values for the respective encoders with the detaching count values for the respective encoders of the registered tools, which are stored in the memory 43. In addition, if a difference between at least one of the received pulse count values for the respective encoders and the detaching count value for each registered tool is equal to or greater than the first threshold value, the detaching determination unit 51 may determine that the operation target tool may be detached from the tool attaching/detaching device 2b. Then, the detaching determination unit 51 may store the pulse count values for the respective encoders received from the operation target tool as the detaching count values for the operation target tool in the memory 43. In this case, when the operation target tool that has been detached from the tool attaching/detaching device 2b is to be attached again on the tool attaching/detaching device 2b, the identification unit 52 compares the pulse count values for the respective encoders received from the operation target tool with the detaching count values for the respective encoders of each of the registered tools stored in the memory 43. When a difference between each pulse count value and the corresponding detaching count value of any one of the registered tools is less than the second threshold value, the identification unit 52 may determine that the operation target tool is the registered tool corresponding to a set of the detaching count values. In addition, when the memory 43 does not store a set of detaching count values so that a difference between each pulse count value and the corresponding detaching count value is less than the second threshold value, the identification unit 52 may determine that the operation target tool is different from each registered tool.

FIG. 7 is a diagram illustrating another example of the detaching count values stored in the memory 43 according to the variation. In the variation, as illustrated in Table 700, a set of two or more detaching count values is recorded for each of the registered tools. For example, for a tool 1, detaching count values "1234567" and "2345678" are stored. For a tool 2, detaching count values "3456789" and "4567890" are stored. It is assumed that the first and second threshold values are 10, respectively. In this case, in detaching the operation target tool attached to the tool attaching/detaching device 2b, when pulse count values received by the controller 4 from the operation target tool are "1234567" and "4567890", for both of the tool 1 and the tool 2, a difference between at least one of the pulse count values and the corresponding detaching count value is equal to or greater than the first threshold value, and therefore, the detaching determination unit 51 determines that the operation target tool may be detached. In contrast, when pulse count values received by the controller 4 from the operation target tool are "1234569" and "2345677", for the tool 1, a difference between each pulse count value and the corresponding detaching count value is less than the first threshold value, and therefore, the detaching determination unit 51 determines that the operation target tool may not be detached. Subsequently, the detaching determination unit 51 instructs the operation target tool to rotate at least one of the motors to move the movable member.

In attaching the operation target tool on the tool attaching/detaching device 2b, when pulse count values received by the controller 4 from the operation target tool are "1234567" and "4567890", for both of the tool 1 and the tool 2, a difference between at least one of the pulse count values and the corresponding detaching value is equal to or greater than the second threshold value, and therefore, the identification unit 52 determines that the operation target tool is neither the tool 1 nor the tool 2. In contrast, when pulse count values received by the controller 4 from the operation target tool are "1234569" and "2345677", for the tool 1, a difference between each pulse count value and the corresponding detaching count value is less than the second threshold value, and therefore, the identification unit 52 determines that the operation target tool is the tool 1.

According to the variation, since a plurality of pulse count values are used for identification of the tool, the controller can more correctly identify the tool.

Note that, only if a difference between each of the received pulse count values for the respective encoders and the corresponding detaching count value for each of the registered tools is equal to or greater than the first threshold value, the detaching determination unit 51 may determine that the operation target tool may be detached from the tool attaching/detaching device 2b.

Alternatively, even when the tool 3 includes a plurality of motors and a plurality of encoders, the detaching determination unit 51 may use only one pulse count value for one of the encoders in the detaching determination process. Similarly, the identification unit 52 may use only one pulse count value for one of the encoders in the identification process. In this case, when the tool is detached from the tool attaching/detaching device 2b, a pulse count value for an encoder for detecting the number of rotations of a motor, among the motors, which is locked by the braking mechanism so as not to rotate, is preferably used in the detaching determination process and the identification process.

Alternatively, when the control unit 35 of the operation target tool receives an inquiry from the controller 4 about the position of the movable member/members, the control unit 35 may calculate a total of the pulse count values for the respective encoders and output the total to the controller 4 through the signal line 7. Then, the detaching determination unit 51 may use the total of the pulse count values for the respective encoders as a single pulse count value in the detaching determination process. Similarly, the identification unit 52 may use the total of the pulse count values for the respective encoders as the single pulse count value in the identification process. In this case, even when the number of encoders is different for each tool, by executing processes similar to those in the embodiment described above, the controller 4 can determine whether or not to allow the tool to be detached and identify the tool.

In the embodiment or the variation described above, in a case in which the operation target tool does not include the braking mechanism, the movable member 31 will move when the operation target tool is detached from the tool attaching/detaching device 2*b*. In this case, the detaching determination unit 51 and the identification unit 52 may use a pulse count value at a predetermined position to which the movable member 31 moves in a process to be described below in the detaching determination process and the identification process.

In this case, after the operation target tool is attached for the first time on the tool attaching/detaching device 2*b*, in order to determine whether or not to allow the operation target tool to be detached, in accordance with the program that specifies the motion of the movable member 31 or in accordance with the instruction of the operator, the detaching determination unit 51 rotates the motor 32 of the operation target tool in a predetermined direction. Subsequently, the detaching determination unit 51 may receive a pulse count value obtained when the movable member 31 reaches a reference point provided in the operation target tool from the operation target tool and execute the detaching determination process on the basis of the received pulse count value. In the detaching determination process, step S101 is replaced by the processing in which, when the control unit 35 of the operation target tool detects that the movable member 31 reaches the reference point, the control unit 35 outputs the pulse count value to the detaching determination unit 51. In addition, in step S103, the detaching determination unit 51 does not move the movable member by the certain amount, but informs the operator that the reference point is a point where detaching is not possible through the user interface. In this case, after changing the position of the reference point in the tool, the operator may issue an instruction again to determine whether or not to allow the operation target tool to be detached. Alternatively, the detaching determination unit 51 may add any number of rotations to or subtract any number of rotations from the number of rotations of the encoder 33 from the origin stored in the storage unit 34 of the operation target tool in such a way that a difference between the pulse count value and each pulse count value stored in the memory 43 is equal to or greater than the threshold value Th1. The process of step S105 is executed when an instruction for detaching the tool is separately issued by a program or the operator. Note that the reference point is an example of the predetermined position of the movable member and is a position of a limit switch attached to the operation target tool or at the end of a motion range of the movable member, or the like. It is possible to detect that the movable member 31 has reached the reference point by a signal from the limit switch or a contact torque of the motor 32 when the movable member reaches the end of the motion range. In addition, since detaching determination is made when attaching the operation target tool, in detaching the operation target tool from the tool attaching/detaching device 2*b*, the operation target tool can be detached even when the movable member 31 is located at any position. Note that the detaching determination may be made only once when attaching the tool for the first time.

When the operation target tool is attached again on the tool attaching/detaching device 2*b*, in order to rotate the motor 32 in the predetermined direction, the identification unit 52 may supply, through the drive circuit 42 and the power line 6, electric power to the operation target tool, receive the pulse count value obtained when the movable member 31 reaches the reference point, and execute an identification process similar to that in the embodiment described above.

As described above, even when the tool does not include the braking mechanism, the controller can identify the tool attached to the robot.

All examples and specific terms recited herein are intended to have teaching purpose to aid the reader in understanding the concepts contributed by the inventor to the present invention and furthering the art, and are to be construed so as not to limit the composition of any example and specific recited examples and conditions to indicate the superiority and inferiority of the invention in this specification. Although the embodiment of the present invention is described in detail, it is to be understood that various changes, substitutions, and modifications can be made hereto without departing from the spirit and scope of the invention.

What is claimed is:

1. A robot controller comprising:
a memory configured to store a first value representing a first position of a first movable member detected by a first position detector when a first tool including the first movable member and the first position detector that detects the first position of the first movable member is detached from a robot or when the first movable member moves to a predetermined position; and
a processor configured to
execute a predetermined process in accordance with a difference between the first value stored in the memory and a second value representing a second position of a second movable member detected by a second position detector when a second tool including the second movable member and the second position detector that detects the second position of the second movable member is attached to the robot or when the second movable member moves to the predetermined position after the second tool is attached to the robot,
wherein the processor is configured to control the robot or the second tool based on the difference between the first value and the second value.

2. The robot controller according to claim 1, wherein
the processor is configured to execute, as the predetermined process, a process of:
identifying or informing that the second tool is identical with the first tool when the difference between the second value and the first value stored in the memory is less than a predetermined threshold value, or
identifying or informing that the second tool is identical with the first tool when the difference between the first value stored in the memory and the second value when the second movable member moves to the predetermined position after the second tool is attached to the robot is less than a predetermined threshold value.

3. A robot controller comprising:

a memory configured to store a first value representing a position of a movable member detected by a position detector when a tool including the movable member and the position detector that detects the position of the movable member is detached from a robot or when the movable member moves to a predetermined position; and a processor configured to determine whether or not to allow the tool to be detached in accordance with a first difference between the first value stored in the memory and a second value representing a current position of the movable member detected by the position detector, and control the tool based on the first difference between the first value and the second value, or determine whether or not to allow the tool to be detached in accordance with a second difference between the first value stored in the memory and a third value which represents the position of the movable member and is obtained when the movable member is at the predetermined position, and control the tool based on the second difference between the first value and the third value.

4. A robotic system comprising:

at least one tool;

a robot including an attaching/detaching device configured to enable the at least one tool to be attached thereto/detached therefrom; and a controller configured to control the robot, wherein the at least one tool includes:

a movable member; and a position detector configured to detect a position of the movable member, and wherein the controller includes:

a memory configured to store a first value representing the position of the movable member of any one of the at least one tool detected by the position detector of the tool when the tool is detached from the robot or when the movable member of the tool moves to a predetermined position; and a processor configured to execute a predetermined process in accordance with a difference between the first value stored in the memory and a second value representing the position of the movable member of any one of the at least one tool detected by the position detector of the tool when the tool is attached to the robot or when the movable member of the tool moves to the predetermined position after the tool is attached to the robot.

* * * * *